US012658725B2

(12) United States Patent (10) Patent No.: US 12,658,725 B2
Liu (45) Date of Patent: Jun. 16, 2026

(54) ELECTRIC RIDING VEHICLE

(71) Applicant: ACCEL POWER TECHNOLOGY (SHENZHEN) CO., LTD., Shenzhen (CN)

(72) Inventor: Lirui Liu, Shenzhen (CN)

(73) Assignee: ACCEL POWER TECHNOLOGY (SHENZHEN) CO., LTD., Shenzhen (CN)

( * ) Notice: Subject to any disclaimer, the term of this patent is extended or adjusted under 35 U.S.C. 154(b) by 538 days.

(21) Appl. No.: 18/304,479

(22) Filed: Apr. 21, 2023

(65) Prior Publication Data

US 2023/0352957 A1 Nov. 2, 2023

Related U.S. Application Data

(63) Continuation of application No. PCT/CN2022/092696, filed on May 13, 2022.

(30) Foreign Application Priority Data

Apr. 29, 2022 (CN) .......................... 202221059764.4

(51) Int. Cl.
B60L 50/64 (2019.01)
B60L 1/00 (2006.01)
(Continued)

(52) U.S. Cl.
CPC .............. H02J 7/855 (2026.01); B60L 1/006 (2013.01); H02J 7/50 (2026.01); B60L 2200/12 (2013.01); B62J 43/28 (2020.02); H02J 2207/20 (2020.01)

(58) Field of Classification Search
CPC . B60L 2200/12; B60L 50/66; B60K 2204/00; H02J 7/0013; H02J 7/0063; H02J 2207/20
See application file for complete search history.

(56) References Cited

U.S. PATENT DOCUMENTS

2008/0018303 A1 1/2008 Scheucher et al.
2011/0042156 A1* 2/2011 Vincenz ................. B62K 19/40
224/412
(Continued)

FOREIGN PATENT DOCUMENTS

CN 201494324 U 6/2010
CN 103503273 A 1/2014
(Continued)

OTHER PUBLICATIONS

Yi et al., A spare battery device for an electric vehicle, Jan. 18, 2019, EPO, CN 109244298 A, Machine Translation of Description (Year: 2019).*

(Continued)

*Primary Examiner* — James A English
(74) *Attorney, Agent, or Firm* — FINNEGAN, HENDERSON, FARABOW, GARRETT & DUNNER LLP

(57) ABSTRACT

The present application relates to an electric riding vehicle, wherein the battery is used as an energy storage power source. The electric riding vehicle includes an electric riding vehicle and an inverter. The electric riding vehicle includes an electric bicycle, an electric motorcycle car, an electric scooter, an electric balance car, an electric two-wheeled vehicle, an electric tricycle and an electric four-wheeled vehicle. The electric riding vehicle includes a controller, at least one battery, and one motor. The at least one battery is detachably arranged on the frame of the electric riding vehicle as a power source and is electrically connected to the controller. The controller is electrically connected to the motor. The inverter is electrically connected to the battery. The current output by the battery is changed by the inverter to power an electrical equipment and the battery is converted into an energy storage power source.

13 Claims, 14 Drawing Sheets

(51) Int. Cl.
  H02J 7/00 (2006.01)
  H02J 7/50 (2026.01)
  B62J 43/28 (2020.01)

(56) References Cited

U.S. PATENT DOCUMENTS

| | | | | |
|---|---|---|---|---|
| 2012/0007446 | A1 | 1/2012 | Ro et al. | |
| 2014/0319907 | A1* | 10/2014 | Yamazaki | B62J 43/16 |
| | | | | 180/220 |
| 2017/0259692 | A1* | 9/2017 | Orimo | B62J 43/28 |
| 2017/0297652 | A1 | 10/2017 | Yoshiie et al. | |
| 2019/0217912 | A1* | 7/2019 | Schneider | B62M 7/12 |
| 2019/0248439 | A1* | 8/2019 | Wang | B62K 11/10 |
| 2021/0394865 | A1* | 12/2021 | Wesling | B62M 25/08 |

FOREIGN PATENT DOCUMENTS

| | | | |
|---|---|---|---|
| CN | 206611196 | U | 11/2017 |
| CN | 109244298 | A | 1/2019 |
| CN | 114421595 | A | 4/2022 |
| JP | 2013099200 | A | 5/2013 |

OTHER PUBLICATIONS

International Search Report and Opinion issued for PCT/CN2022/092696, mailed from China National Intellectual Property Administration (CNIPA) on Dec. 15, 2022.
Extended European Search Report in counterpart European Patent Application No. 22891182.2 dated Oct. 14, 2024.

* cited by examiner

ELECTRIC RIDING VEHICLE

CROSS REFERENCE TO RELATED APPLICATIONS

This application is a continuation of International Application No. PCT/CN2022/092696, filed May 13, 2022, which is based on and claims priority to Chinese Patent Application No. 202221059764.4, filed Apr. 29, 2022, the entire contents of all of which are incorporated herein by reference.

TECHNICAL FIELD

The present application relates to the technical field of energy storage power source equipment and, in particular, to an electric riding vehicle product in which the battery of an electric riding vehicle is extended to an energy storage power source.

BACKGROUND

More and more young people choose electric riding vehicles, such as electric bicycle, electric scooter, electric balance car, etc. as their travel means of transportation, to meet the needs of short-distance travel (the distance between the residence and the travel destination is about 2-3 kilometers). At present, the battery used by the electric riding vehicle can only be used as a power storage function for supplying power to the motor of the vehicle, and there is no other purpose. The battery has a single application and cannot be used optimally.

Electric riding vehicles are becoming more and more popular as an essential means of transportation for users' daily travel, but the battery of electric riding vehicles has single use and is not very economical.

SUMMARY

The purpose of the present application is to provide an electric riding vehicle product in which the battery of the electric riding vehicle is expanded into an energy storage power source, which aims to solve the problems that the battery of the existing electric riding vehicle has a single use and is not economical.

In order to achieve the above purpose, the technical solution adopted by the present application is as follows: an electric riding vehicle product includes an electric riding vehicle and an inverter. A battery of the electric riding vehicle product is extended to an energy storage power source. The electric riding vehicle includes an electric bicycle, an electric motorcycle car, an electric scooter, an electric balance car, an electric two-wheeled vehicle, an electric tricycle or/and an electric four-wheeled vehicle. The electric riding vehicle is configured with a controller, at least one battery and a motor, the at least one battery is detachably assembled on the frame of the electric riding vehicle as a power source, the battery is electrically connected to the controller and the controller is electrically connected to the motor, so that the battery supplies power to the motor. The inverter is electrically connected to the battery, so that the current output by the battery is changed by the inverter to power an electrical equipment, so that the battery can be converted into an energy storage power source.

In one embodiment, the battery outputs a direct current, and the output voltage of the battery is in the range of 12 Volts-72 Volts; the inverter is provided with at least one AC outlet for outputting strong AC power, the AC voltage output by the AC outlet is 220V and/or 110V.

In one embodiment, the battery is provided with at least one first discharge port, and the first discharge port is electrically connected to the controller, so that the battery can supplies power to the motor by controller; and the first discharge port is electrically connected to the inverter, so that the current output by the battery is changed by the inverter to power electrical equipment.

In one embodiment, the battery is provided with two or more first discharge ports, one of the first discharge ports is electrically connected to the controller so that the battery supplies power to the motor through the controller; and one of the remaining first discharge ports is electrically connected to the inverter, so that the current output by the battery is changed by the inverter to power electrical equipment.

In one embodiment, the battery is arranged on the frame of the electric riding vehicle, and the housing of the inverter is detachably arranged on the electric riding vehicle; when the battery is not removed from the frame, the inverter is installed on the frame and the battery is electrically connected to the inverter, so that the current output by the battery is changed by the inverter to power electrical equipment; alternatively, after the battery and the inverter are both removed from the frame of the electric riding vehicle, the battery and the inverter are electrically connected to each other, so that the current output by the battery is changed by the inverter to power electrical equipment.

In one embodiment, the number of the batteries is multiple, and the multiple batteries are electrically connected to the inverter in parallel with each other, so as to increase the storage capacity of the energy storage power source.

In one embodiment, each of the batteries is provided with only one first discharge ports, and the inverter is provided with at least one inlet, the inverter is not installed on the frame, when the battery is installed on the frame, the first discharge port is electrically connected to the controller so that the battery can supply power to the motor, and after the battery is removed from the electric riding vehicle, the first discharge port is electrically connected to a corresponding the inlet.

In one embodiment, the electric riding vehicle product further includes a connecting wire, the connecting wire is provided with a first connection terminal and a second connection terminal, the battery is further provided with at least one second discharge port, the inverter is provided with at least one inlet, when the battery is installed on the frame, the first discharge port is electrically connected to the controller to so that the battery supplies power to the motor, after the battery is removed from the electric riding vehicle, the first connection terminal is electrically connected to the second discharge port, and the second connection terminal is electrically connected to the inlet.

In one embodiment, after the battery is removed from the electric riding vehicle, the battery is spliced and arranged on the circumferential side of the inverter, the side wall of the inverter is provided with at least one inlet, and the first discharge port is plugged with the inlet to complete the electrical connection.

In one embodiment, a housing of the inverter is provided with at least one accommodating groove, and the at least one inlet is arranged on the groove wall of the accommodating groove, after the battery is removed from the electric riding vehicle, the battery is put into the accommodating groove and the first discharge port is electrically connected to the inlet.

In one embodiment, the housing of the inverter is provided with only one accommodating groove, and an extension direction of the accommodating groove is as same as a length direction of the inverter, an opening of the accommodating groove is arranged on the end of the housing of the inverter, the other end of the accommodating groove is a closed end, and the at least one inlet is arranged at the closed end, after the battery is removed from the electric riding vehicle, the battery is inserted into the accommodating groove, and the first discharge port is electrically connected to the inlet.

In one embodiment, the circumferential side of the housing of the inverter is provided with only one accommodating groove, and the at least one inlet is arranged on the groove wall of the accommodating groove, after the battery is removed from the electric riding vehicle, the battery is put into the accommodating groove and the first discharge port is electrically connected to the inlet.

In one embodiment, the housing of the inverter is provided with the only one accommodating groove, and a number of the inlets arranged on the groove wall of the accommodating groove is multiple, and the multiple inlets are arranged in parallel with each other, a number of the batteries is multiple, the multiple batteries are stacked and put into the accommodating groove, and the first discharge port of each battery is electrically connected to the inlet correspondingly.

In one embodiment, a plurality of the accommodating grooves are arranged in parallel on the housing of the inverter, and an extension direction of each accommodating groove is as same as a length direction of the inverter, each of the groove walls of the accommodating grooves is provided with one inlet, and the inlets are arranged in parallel with each other, the number of the batteries is multiple, and each of the batteries is put into the accommodating groove correspondingly, the first discharge port of each of the batteries is electrically connected to the inlets correspondingly.

In one embodiment, all the accommodating grooves are arranged on the bottom side wall of the housing of the inverter, and all the accommodating grooves are covered by a cover plate or without cover plate.

In one embodiment, a plurality of the accommodating grooves are arranged on the circumferential side wall of the housing of the inverter, and an extending direction of each of the accommodating grooves is as same as a length direction of the inverter, and all the accommodating grooves are distributed along the circumferential direction and at intervals, the groove wall of each accommodating groove is provided with one inlet, and each of the inlets is arranged in parallel, the number of the batteries is multiple, and each of the batteries is put into the accommodating groove correspondingly, and the first discharge port of each of the batteries are electrically connected to the inlet correspondingly.

In one embodiment, a third discharge port is arranged on the frame of the electric riding vehicle, when the battery is installed on the frame of the electric riding vehicle, the first discharge port of the battery is electrically connected to both the controller and the third discharge port, the electric riding vehicle product further comprises a connecting wire, the connecting wire is provided with a first connection terminal and a second connection terminal, the first connection terminal is electrically connected to the third discharge port, and the second connection terminal is electrically connected to the inverter.

In one embodiment, the inverter is further provided with at least one DC outlet for outputting DC weak current, and the inverter is provided with a transfer switch, the transfer switch is used to connect or disconnect the DC outlet or the AC outlet.

The present application at least has the following beneficial effects:

applying the electric riding vehicle product provided by the embodiment of the present application, the normal use of the battery is to supply power to the motor of the electric riding vehicle. When the battery is used as a power source, the battery is installed on the frame of the electric riding vehicle. At this time, the battery is on the electric riding vehicle. The controller is electrically connected, and the controller is electrically connected to the motor. The battery supplies power to the motor through the controller. On the other hand, when the user needs to use the electrical equipment during the activity, the electric energy stored in the battery is changed by the inverter to power the electrical equipment. This enables the battery to be converted between its two uses as a power source for an electric riding vehicle and as an energy storage power source for powering electrical equipment. In this way, the purpose of the battery used by the electric riding vehicle is no longer just a power source for power storage for the motor of the electric riding vehicle. After the output current of the battery is changed by the inverter, the battery can also be used as a power source for supplying power to the electrical equipment. The energy storage power source increases the usage scenarios of the battery of the electric riding vehicle and improves the use efficiency of the battery. In addition, when the user of the electric riding vehicle is ready to carry out activities, the user does not need to purchase an additional energy storage power source, and can directly use the battery of the electric riding vehicle to connect with the matching inverter as an energy storage power source for powering electrical equipment, which greatly saves the budget expenditure of the user's activities.

BRIEF DESCRIPTION OF DRAWINGS

In order to illustrate the technical solutions in the embodiments of the present application more clearly, the following briefly introduces the accompanying drawings to be used in the description of the embodiments or the prior art. Obviously, the drawings in the following description are only some embodiments for the present application. For those of ordinary skill in the art, other drawings can also be obtained according to these drawings without any creative effort.

Figure 1:
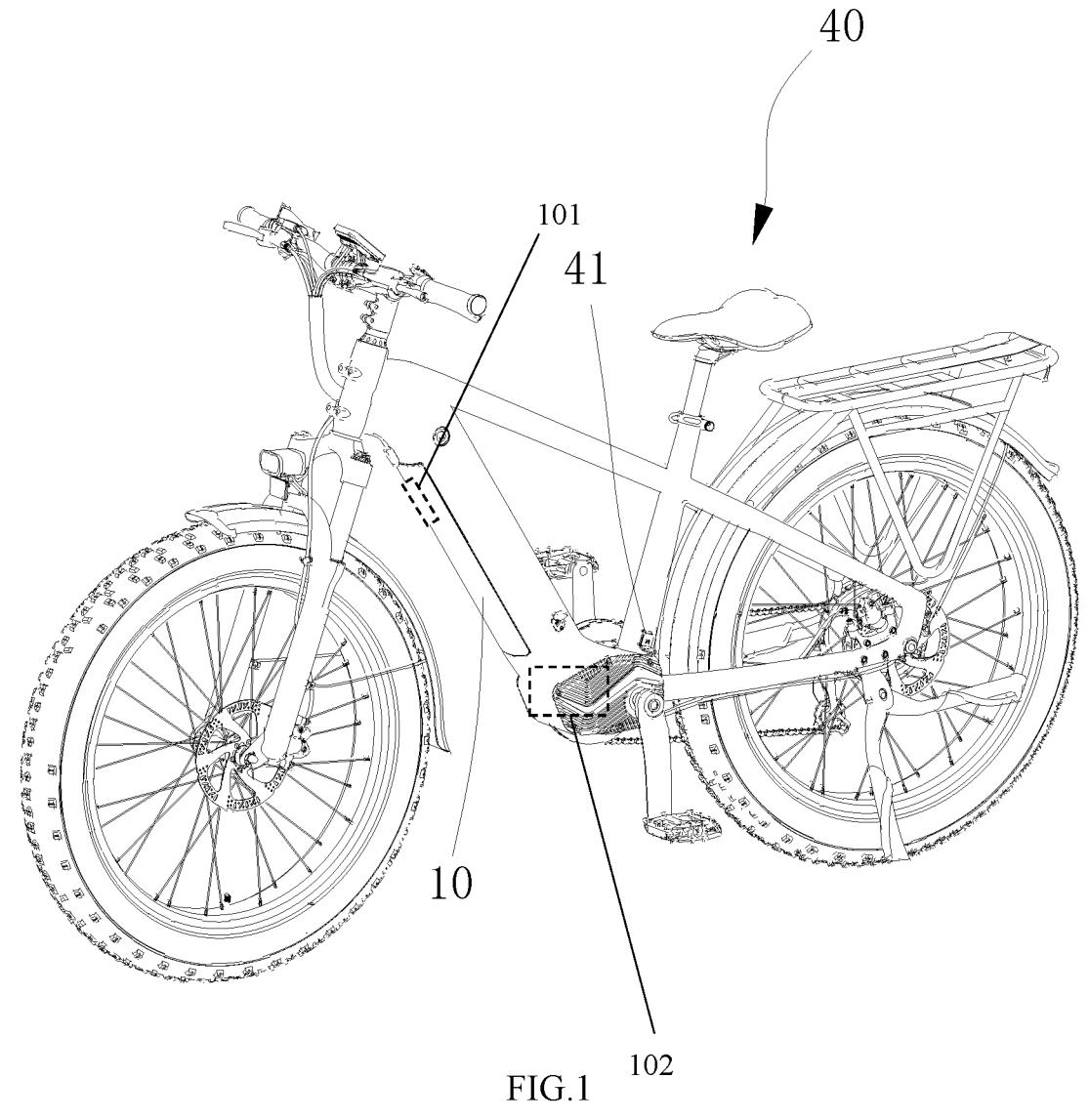
FIG. 1 is a schematic diagram of the electric riding vehicle according to an example of the present application.

Each reference number in the figures is as following:

10—battery; 101—controller; 102—motor; 11—first discharge port; 12—second discharge port;

20—inverter; 21—inlet; 22—outlet; 221—AC outlet; 222—DC outlet; 23—housing; 231—accommodating groove; 232—handle; 24—transfer switch; 25—cover plate;

30—connecting wire; 31—first connection terminal; 32—second connection terminal;

40—electric riding vehicle; 41—third discharge port;

50—portable accommodating box; 51—accommodating space; and 52—open window.

DETAILED DESCRIPTIONS

The examples of the present application are described in detail in the following, the examples are illustrated in the accompanying drawings, the same or similar reference numerals refer to the same or similar elements or elements having the same or similar functions. The examples described below with reference to the accompanying drawings are exemplary, and are intended to be used to explain the present application, but should not be construed as a limitation of the present application.

In the description of the present application, it should be understood that the terms of "length", "width", "upper", "lower", "front", "rear", "left", "right", "vertical", "horizontal", "top", "bottom", "inside", "outside" and other indicated orientations or positional relationships are based on the orientations or positional relationships shown in the accompanying drawings, only for the convenience of describing the present application and simplifying the description, rather than indicating or implying that the indicated device or element must have a particular orientation, be constructed and operate in a particular orientation, thus should not be construed as a limitation of the present application.

In addition, the terms of "first", "second", etc. are used for descriptive purposes only, and should not be construed as indicating or implying relative importance or implying the number of indicated technical features. Thus, a feature defined as "first", "second", etc., may expressly or implicitly include one or more that features. In the description of the present application, "a plurality of" means two or more, unless otherwise expressly and specifically defined.

In the present application, unless otherwise expressly specified and limited, the terms of "installation", "connection", "connected", "fixed" and other terms should be understood in a broad sense, for example, it may be a fixed connection or a detachable connection, or integration; it can be a mechanical connection or an electrical connection; it can be a direct connection or an indirect connection through an intermediate medium, and it can be the internal communication between the two elements or the interaction relationship between the two elements. For those of ordinary skill in the art, the specific meanings of the above terms in the present application can be understood according to specific situations.

In the example of the present application, the electric riding vehicle 40 includes, but is not limited to, an electric bicycle, an electric motorcycle car, a battery car, an electric scooter, an electric balance car, and the like. The electric bicycle is taken as an example for detailed description below. As shown in FIG. 1, the main body of the electric bicycle is as same as that of a general bicycle, so it is not repeated here. In addition, the electric bicycle is provided with a controller 101 and a motor 102, and the controller is electrically connected to the motor. When battery 10 is installed on the frame of the electric bicycle, the battery is electrically connected to the control, and after the battery is powered on with the motor by the controller, the controller is controlled by controlling the switch installed on the handle of the electric bicycle, and then the output power of the motor is controlled by the controller, thereby controlling the speed of the electric bicycle. A mounting groove for mounting the battery is arranged on the beam of the electric bicycle, the battery 10 is detachably assembled on the frame of the electric riding vehicle 40 as a power source, and the battery 10 is provided with a first discharge port 11, the first discharge port 11 is electrically connected to the motor of the electric riding vehicle 40 to supply power.

As shown in FIG. 1-FIG. 4, the product provided by the example of the present application includes battery 10 that can be used for power supply of electric bicycle, and also includes inverter 20. Specifically, the inverter 20 is provided with an inlet 21 and at least one outlet 22 for supplying power to an electrical device. When the first discharge port 11 is electrically connected to the inlet 21 (that is, when the battery 10 is installed on the electric bicycle), the current output by the battery 10 is changed by the inverter 20, and the changed current is output from the outlet 22 for powering electric equipment. At this time, the battery 10 of the electric bicycle used as the power source is converted into the energy storage power source.

Applying the electric riding vehicle product provided by the example of the present application, the normal use of battery 10 is to supply power to the motor of electric bicycle, and battery 10 is installed on the frame of electric bicycle as a power source, and the battery 10 is electrically connected to the controller on the electric bicycle, the controller is electrically connected to the motor. Battery 10 supplies power to the motor through the controller. On the other hand, when the user needs to use electrical equipment during the activity, the electric energy stored in battery 10 is changed by inverter 20 from outlet 22 and output to supply power to electrical equipment. In this way, the battery 10 can be converted between two uses: as a power source for an electric bicycle and an energy storage power source for supplying power to electrical equipment. In this way, the purpose of battery 10 used by electric bicycle is no longer just the power source of power storage for the motor of electric bicycle. After the output current of battery 10 is changed by inverter 20, the battery can also be used as energy storage for power supply to electrical equipment, which increases the usage scenarios of battery 10 of electric bicycle, and improves the use efficiency of battery 10.

Moreover, when the user of electric bicycle is preparing to carry out activities, the user does not need to purchase additional energy storage power source, and can directly use the battery 10 of electric bicycle to connect with to matching inverter 20 as an energy storage power source to supply power to electrical equipment, which greatly saves the budget expenditure of the user's activities.

Figure 3:
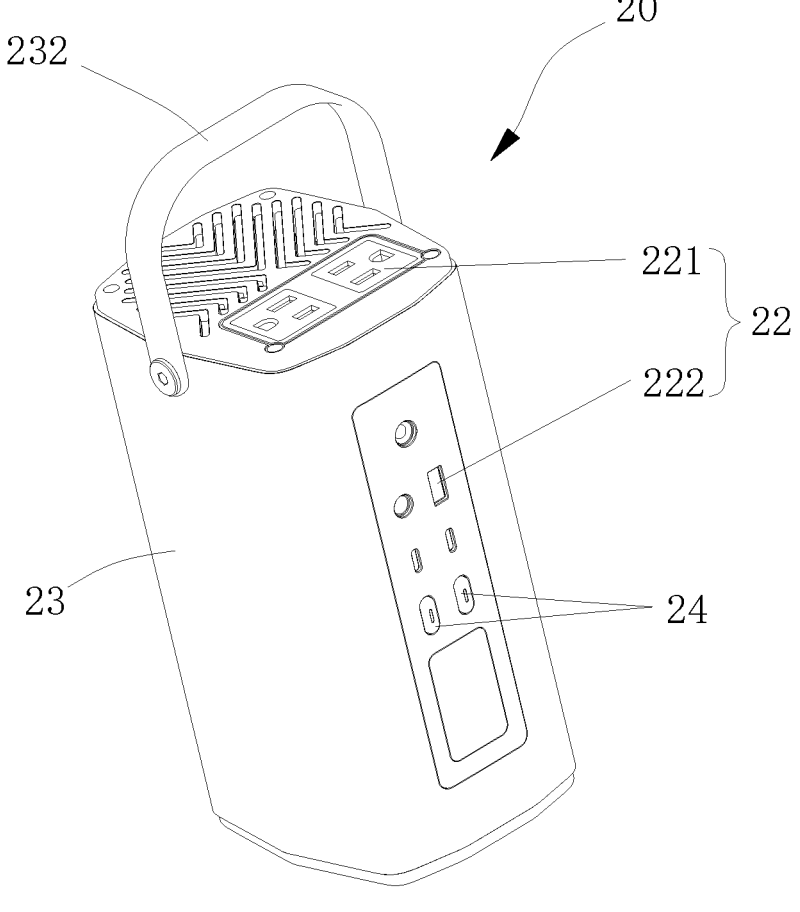
FIG. 3 is a first schematic diagram of one kind of inverter according to an example of the present application.
Figure 4:
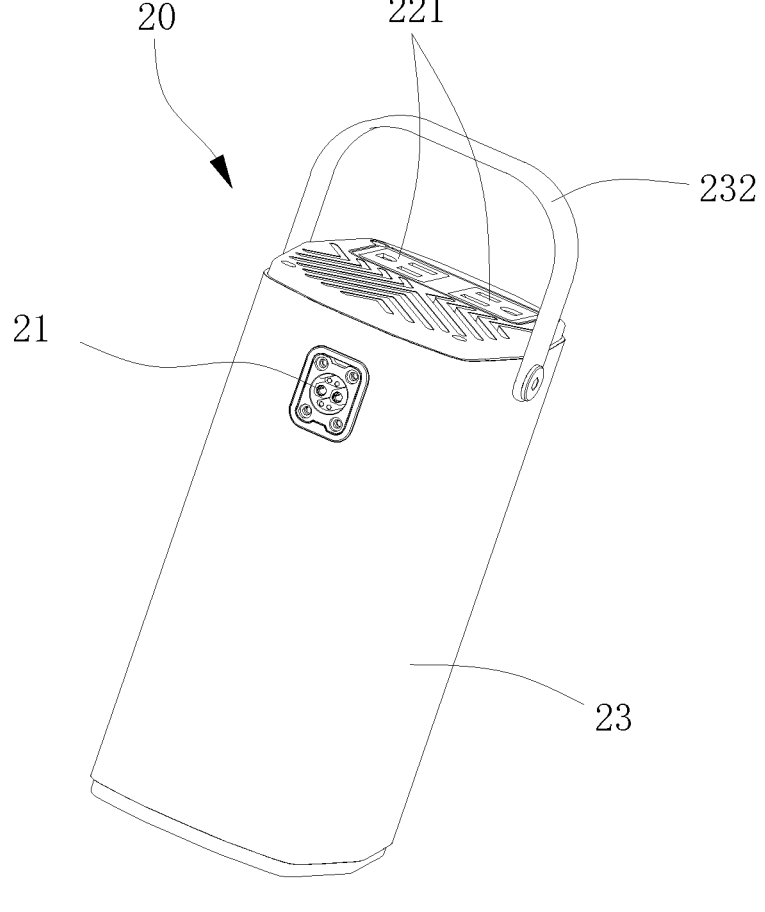
FIG. 4 is a second schematic diagram of one kind of inverter shown in FIG. 3.

In this electric riding vehicle product, the battery 10 directly outputs direct current, and the output voltage of the battery 10 ranges from 12V to 72V. As shown in FIG. 3, the outlet 22 includes at least one AC outlet 221 for outputting strong alternating current. In this example, the AC outlet 221 may be a three-socket socket or a two-socket socket. The AC voltage output by the AC outlet 221 is 220V and/or 110V. When the number of the AC outlet 221 is only one, the AC outlet 221 can output a voltage of 220V, or the AC outlet 221 can output a voltage of 110V; When there are two or more AC outlets, at this time, all AC outlets 221 may output 220V, or all AC outlets 221 may output 110V, and some AC outlets 221 may output 220V and the remaining AC outlets 221 may output 110V.

As shown in FIG. 3, the outlet 22 of the inverter 20 further includes at least one DC outlet 222 for outputting DC weak current. In this example, the DC outlet 222 includes but is not limited to a USB socket and a cigarette lighter socket.

Furthermore, as shown in FIG. 3, the inverter 20 is provided with a transfer switch 24, and the transfer switch 24 is used to turn on or turn off the DC outlet 222 or the AC outlet 221. When the user wants to output AC power to the electrical equipment (such as lighting equipment, audio equipment, etc.), the user turns on the AC outlet 221 by the transfer switch 24 to output current, when the user wants to output DC weak current to supply power to, such as, mobile phones, laptops, tablet computers, etc., for charging, the user switches on the DC outlet 222 by the transfer switch 24. Correspondingly, the user can also disconnect the AC outlet 221 and the DC outlet 222 through the transfer switch 24.

Figure 6:
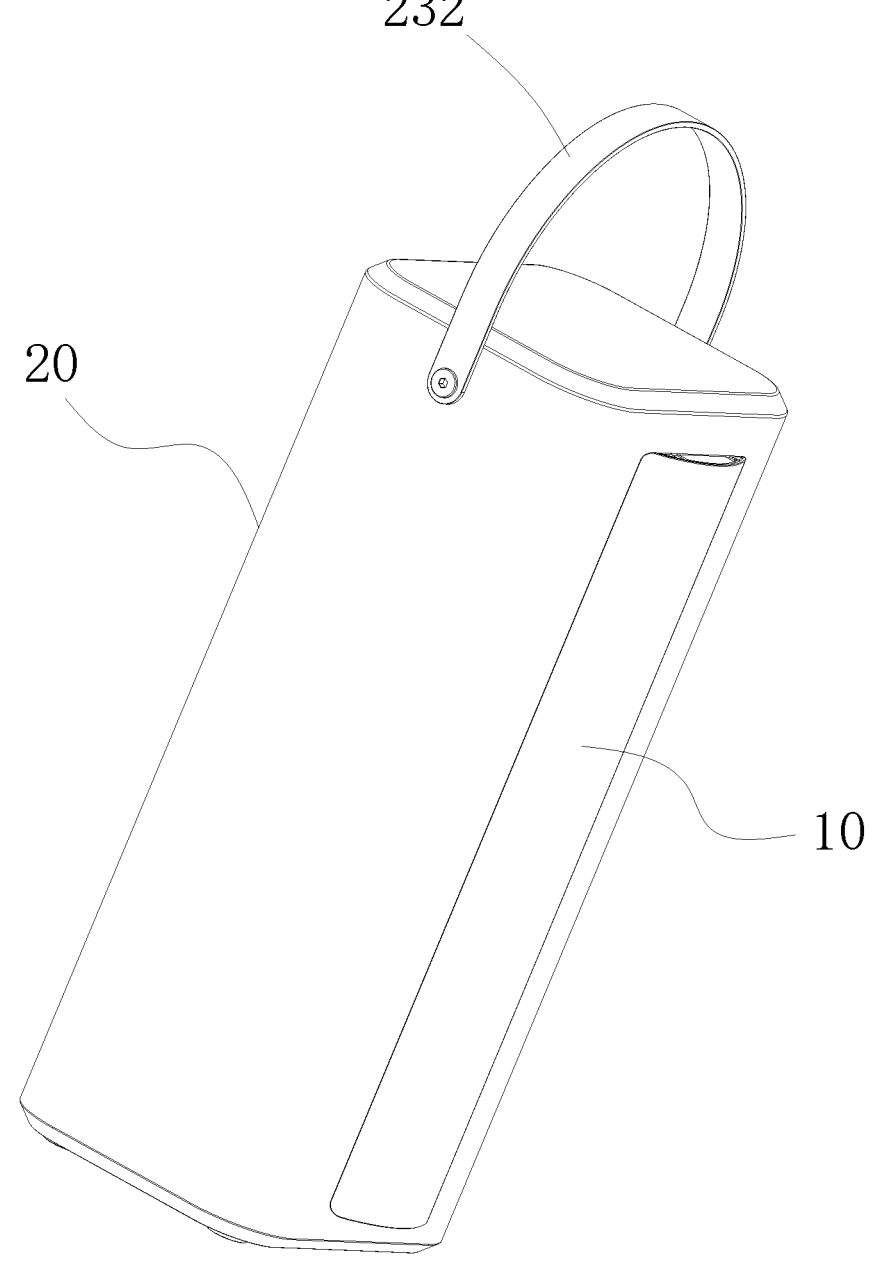
FIG. 6 is a first schematic diagram of one kind of assembly method of the inverter and battery according to an example of the present application.
Figure 7:
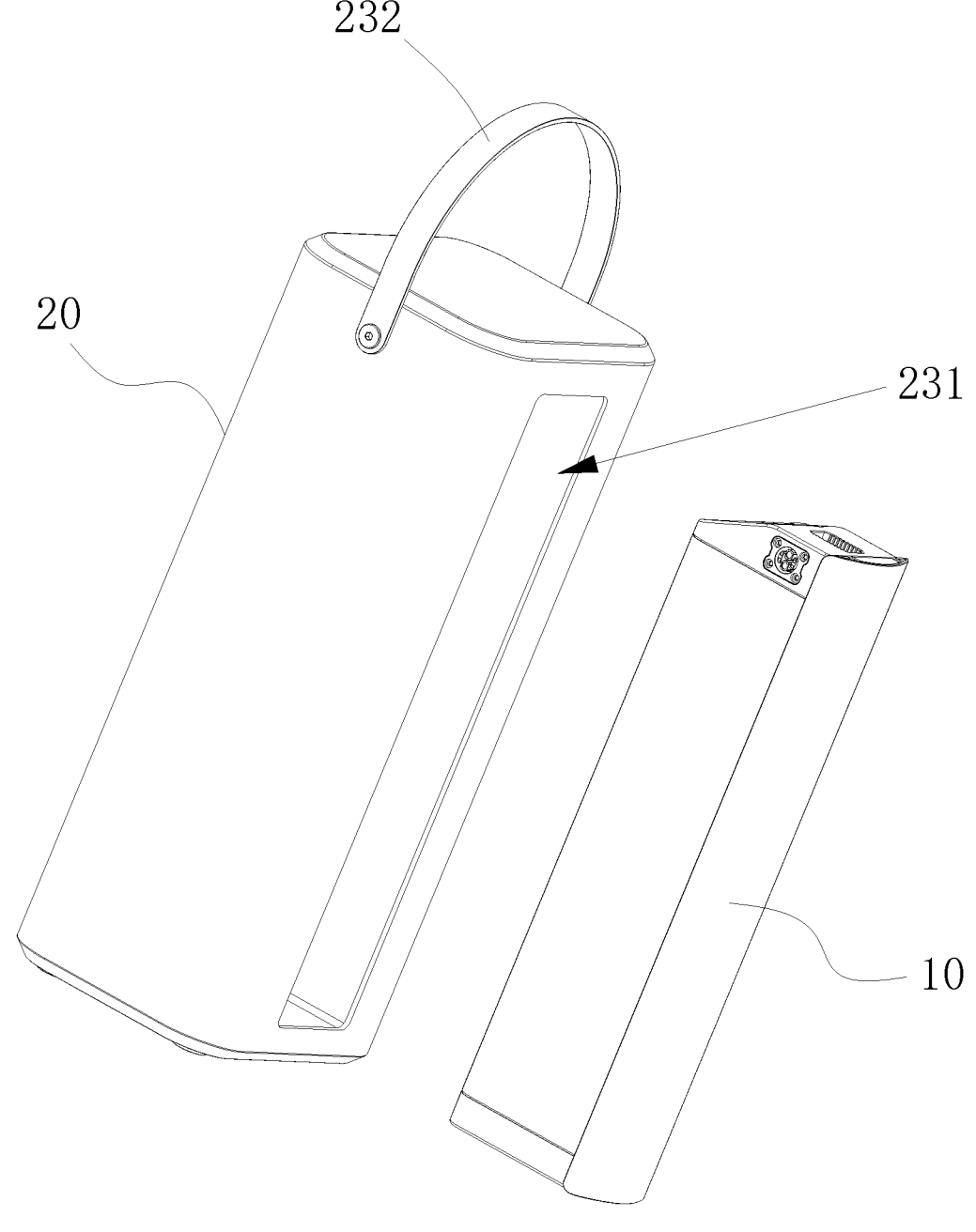
FIG. 7 is a second schematic diagram of an assembly method of the inverter and the battery shown in FIG. 6
Figure 8:
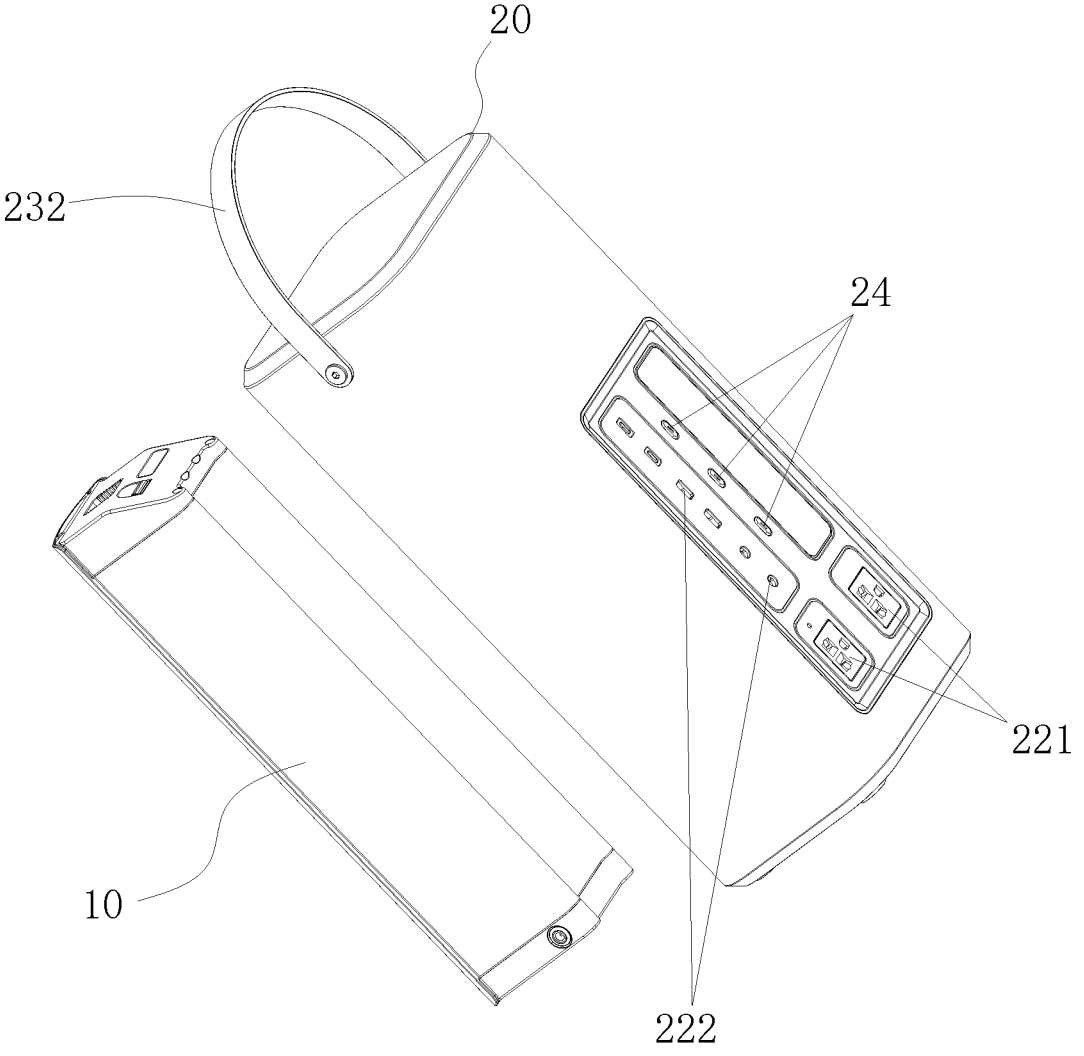
FIG. 8 is a third schematic diagram of an assembly method of inverter and battery shown in FIG. 6.

In one example, the battery 10 of the electric riding vehicle product provided by the example of the present application is provided with only one first discharge port 11, and the only one first discharge port 11 is used for outputting current and also used to charge the battery cells of battery 10. As shown in FIGS. 6-8, an accommodating groove 231 is arranged on the circumferential side of the housing 23 of the inverter 20 of this example, and the inlet 21 is arranged on the groove wall of the accommodating groove 231. When the user is ready to do the activity, the user removes the battery 10 from the electric bicycle, and then puts the battery 10 into the accommodating groove 231, and the first discharge port 11 and the inlet 21 on the groove wall are electrically connected at the same time. In this way, the battery 10 and the inverter 20 are combined into an integrated energy storage power source, which reduces the occupied space and is convenient for users to carry.

When the battery 10 is detachably assembled in the accommodating groove 231 of the inverter 20, the battery 10 can be taken out of the accommodating groove 231 and then is assembled on the electric bicycle as the power source. Alternatively, the housing of the inverter 20 is installed on the electric bicycle detachably (in this case, there is no need to take the battery 10 out of the accommodating groove 231), and then the battery 10 is electrically connected to the motor as a power source.

Figure 13:
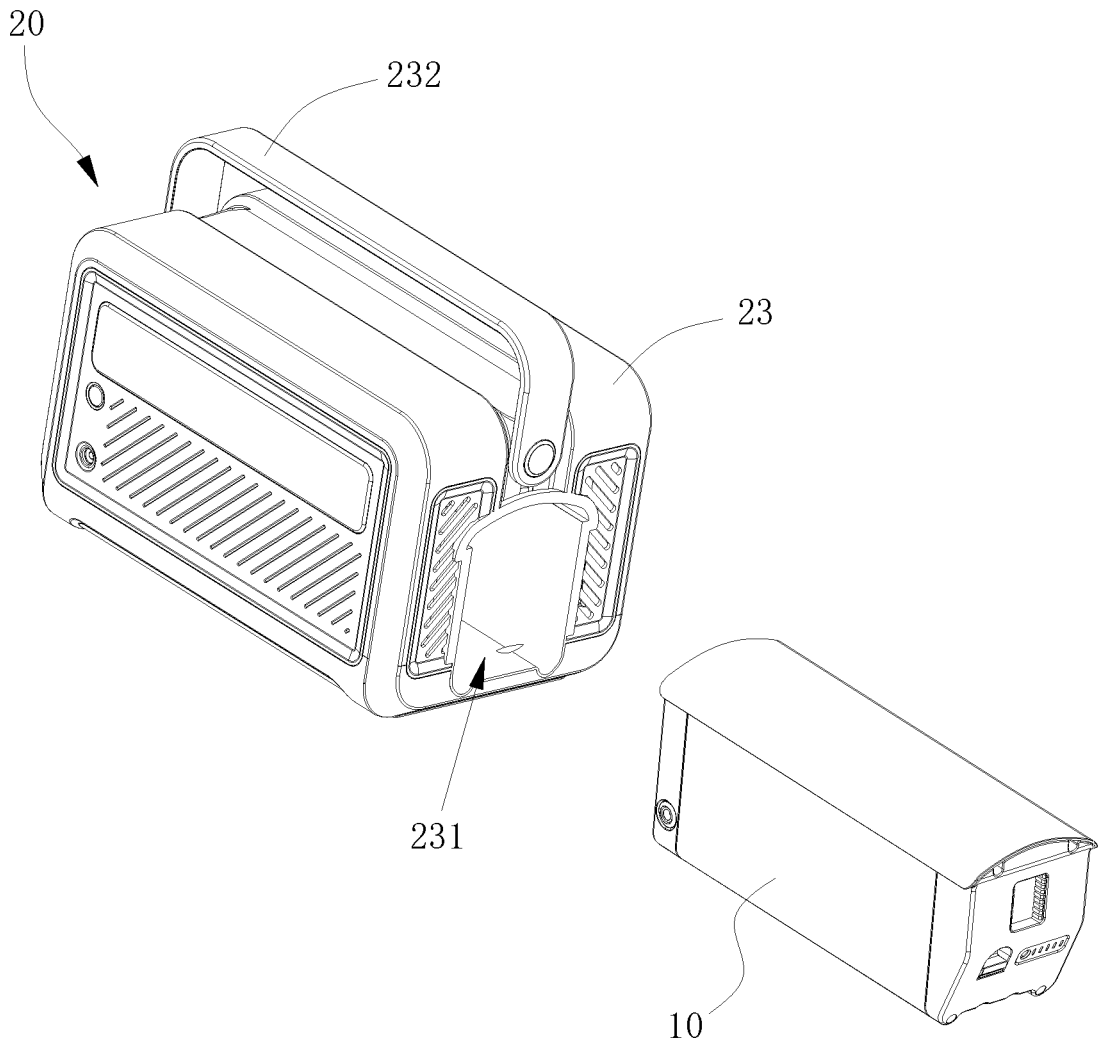
FIG. 13 is a schematic diagram of an assembly method of an inverter and a battery according to an example of the present application.

In an example as shown in FIG. 13, only one accommodating groove 231 is arranged on the housing 23 of the inverter 20, the extension direction of the accommodating groove 231 is as same as the length direction of the inverter 20, and the opening of the accommodating groove 231 is arranged on the end of the housing 23 of the inverter 20, the other end of accommodating groove 231 is a closed end, and at least one inlet 21 is arranged at closed end. After the battery 10 is removed from the electric bicycle, the battery 10 is inserted into the accommodating groove 231 (the insertion direction of the battery 10 is as same as the extension direction of the accommodating groove 231), and when the battery 10 is inserted into the accommodating groove 231, the first discharge port 11 of the battery 10 is electrically connected to the inlet 21, so that the current output by battery 10 is changed by inverter 20 to supply power for electrical equipment, so that battery 10 can be converted into energy storage power source.

Figure 9:
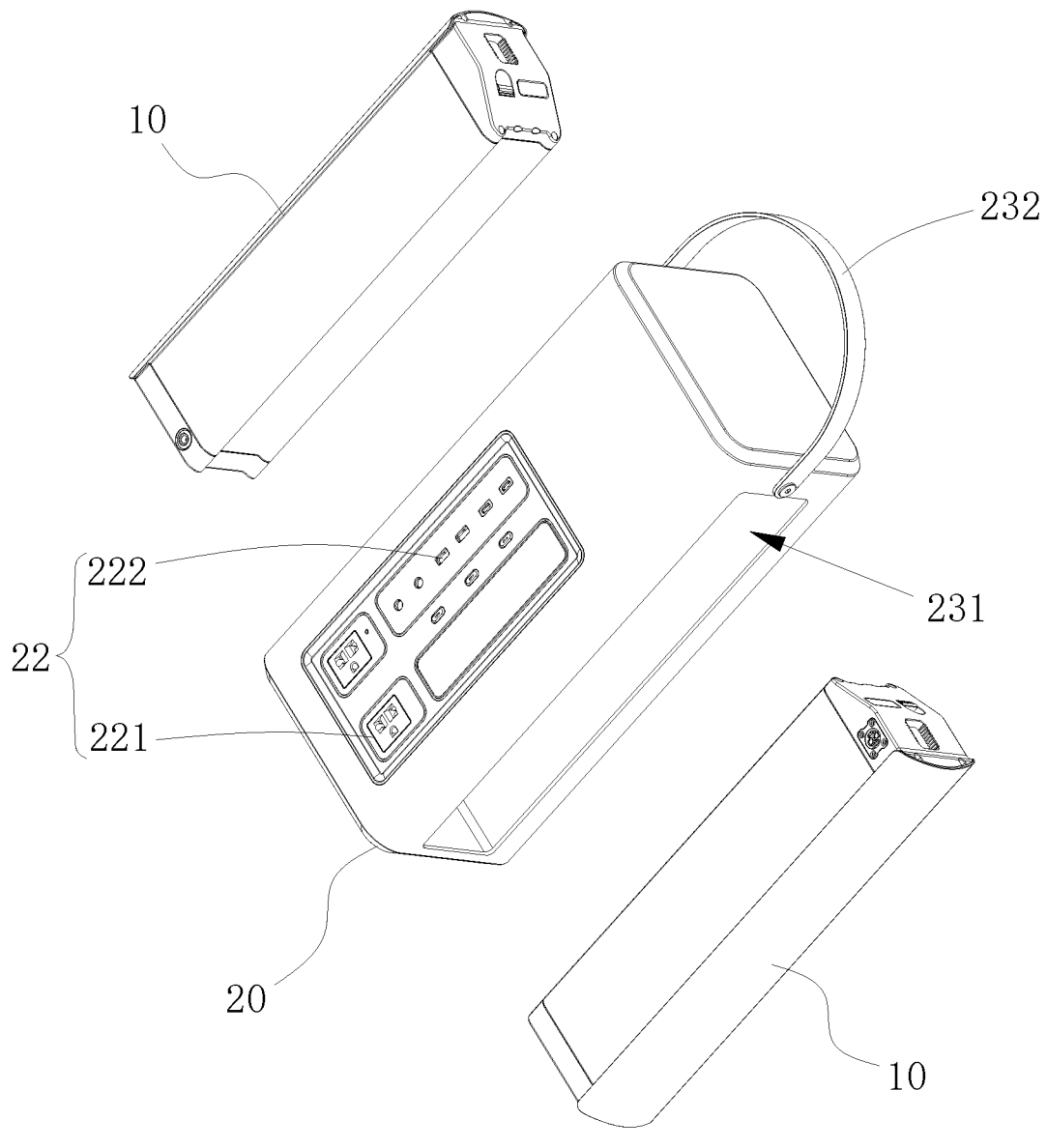
FIG. 9 is a schematic diagram of one kind of assembly method of inverter and battery according to an example of the present application.

In another example, each electric bicycle is provided with two or more batteries 10, and only one battery 10 can be used as the power source of the electric bicycle, or several batteries 10 can be used in parallel as the power source of the electric bicycle. All batteries 10 after parallel connection are used as power source of the electric bicycle. Correspondingly, as shown in FIG. 9, a plurality of accommodating grooves 231 are arranged on the circumferential side of the housing 23 of the inverter 20 in this example. At this time, the number of the accommodating grooves 231 is equal to the number of the arranged batteries 10. Specifically, the extension direction of each accommodating groove 231 is as same as the length direction of the inverter 20, and all the accommodating grooves 231 are distributed in the circumferential direction and at intervals, and each accommodating groove 231 has an inlet 21 on the groove wall, and all the inlet 21 are connected in parallel. The batteries 10 are put into the accommodating groove 231 correspondingly and so as to make the first discharge port 11 of each battery 10 and the corresponding inlet 21 electrically connected at the same time, then multiple batteries 10 can be combined in parallel to form a whole energy storage power source. Thereby, the stored power of the energy storage power source is improved, and the demand for long-term use is satisfied.

Alternatively, a larger accommodating groove 231 is arranged on the housing 23 of the inverter 20, and a plurality of inlets 21 connected in parallel are arranged on the groove wall of the accommodating groove 231. When the battery 10 of the electric bicycle is converted into an energy storage power source, each of the batteries 10 is placed in the accommodating groove 231 in sequence. At this time, the batteries 10 are stacked side by side (not shown). In this way, a plurality of batteries 10 are combined in parallel to form an integral energy storage power source to improve the power storage.

Figure 12:
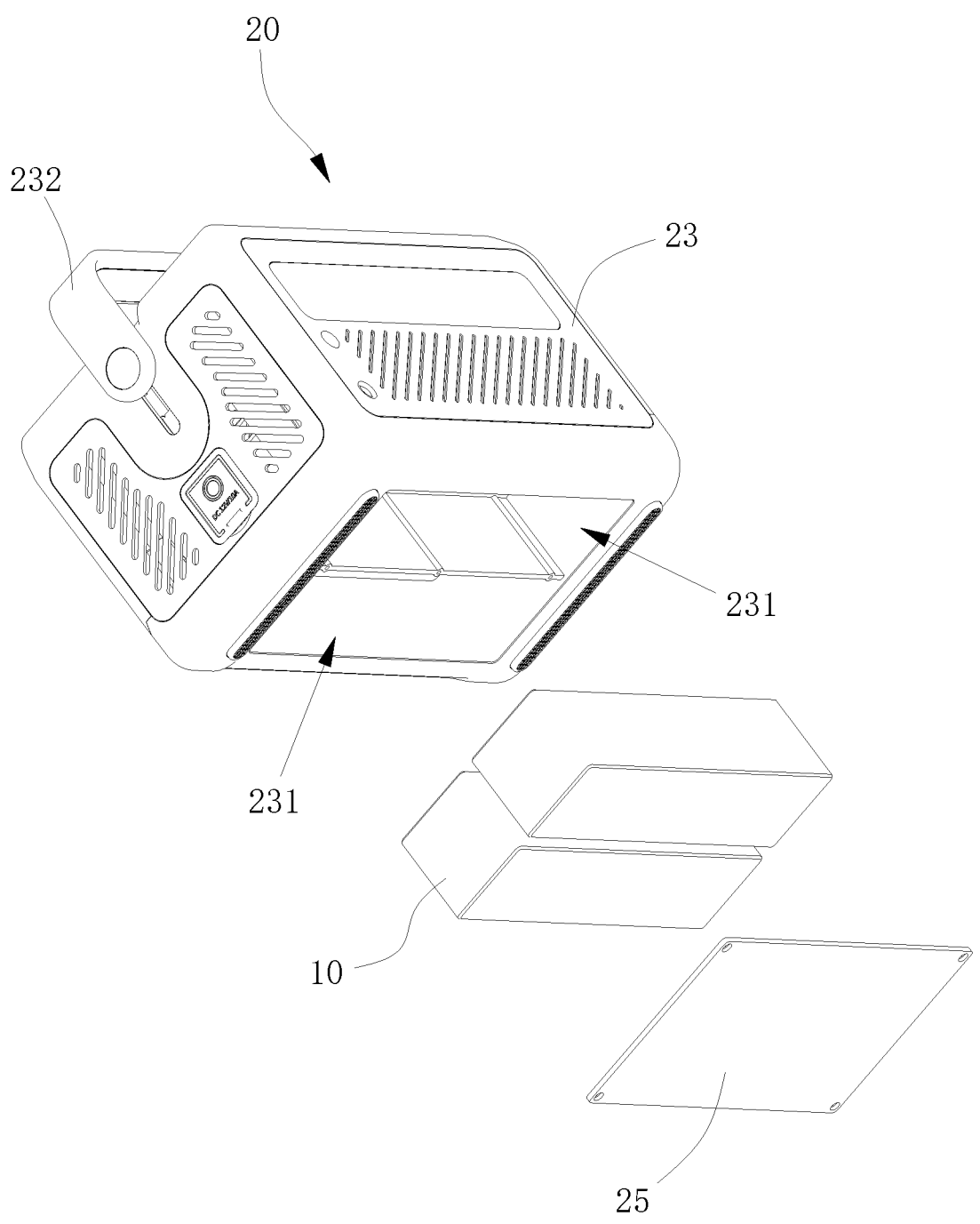
FIG. 12 is a schematic diagram of an assembly method of an inverter and a battery according to an example of the present application.

Alternatively, multiple accommodating grooves 231 are arranged on housing 23 of inverter 20, and the extension direction of each accommodating groove 231 is as same as the length direction of inverter 20. Each accommodating groove 231 has an inlet 21 on the groove wall, and each inlet is arranged in parallel with each other, the number of batteries 10 is multiple (these battery 10 can be a matching battery of the same electric bicycle configuration; or be a combination of batteries of multiple electric bicycles, at this time an electric bicycle is provided with a battery 10). The multiple batteries 10 can be combined in parallel to form a whole energy storage power source, so as to improve the energy storage capacity of the energy storage power source and meet the needs of long-term use. Each battery 10 is put into the accommodating groove 231 correspondingly, and the first discharge port 11 of each battery 10 is electrically connected to the inlet 21 correspondingly, so that the current output by the battery 10 is changed by the inverter 20 and then output to supply power to the electrical equipment, so that the battery 10 can be converted to energy storage power source. Furthermore, as shown in FIG. 12, all the accommodating grooves 231 are arranged on the bottom side wall of the housing 23 of the inverter 20, and all the accommodating grooves 231 are covered by the cover plate 25. When the battery 10 is arranged in the accommodating groove 231, The accommodating groove 231 is capped by the cover plate 25 to encapsulate the battery 10 in the accommodating groove 231. Alternatively, all the accommodating grooves 231 are arranged on the bottom side wall of the housing 23 of the inverter 20, and the battery 10 can be arranged in the accommodating groove 231 correspondingly. The cover plate 25 is no longer used to cover the battery 10, so that the side wall surface of the battery 10 is exposed.

Figure 2:
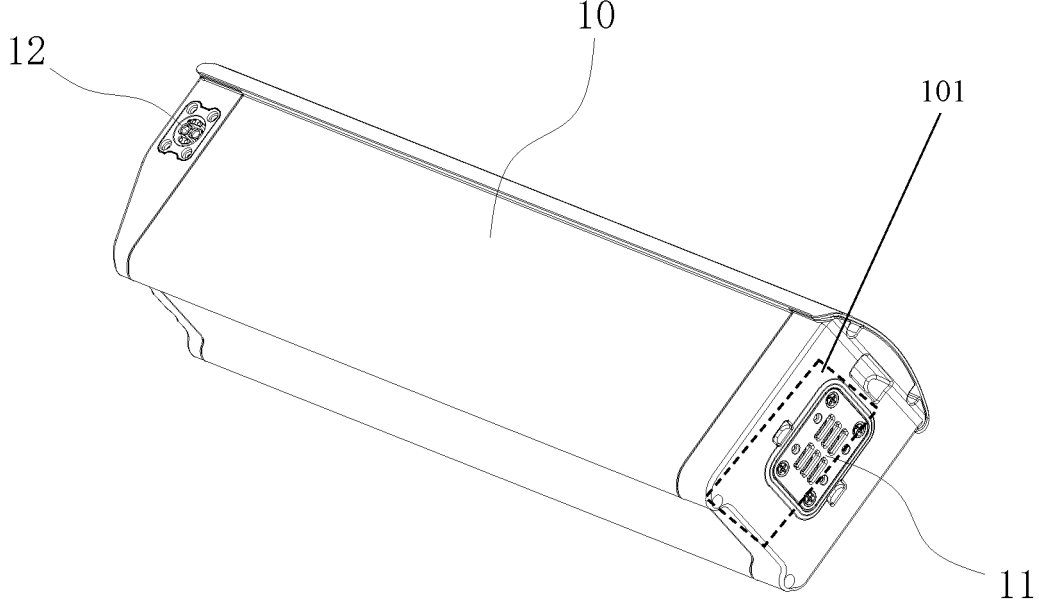
FIG. 2 is a schematic diagram of the battery according to an example of the present application.
Figure 5:
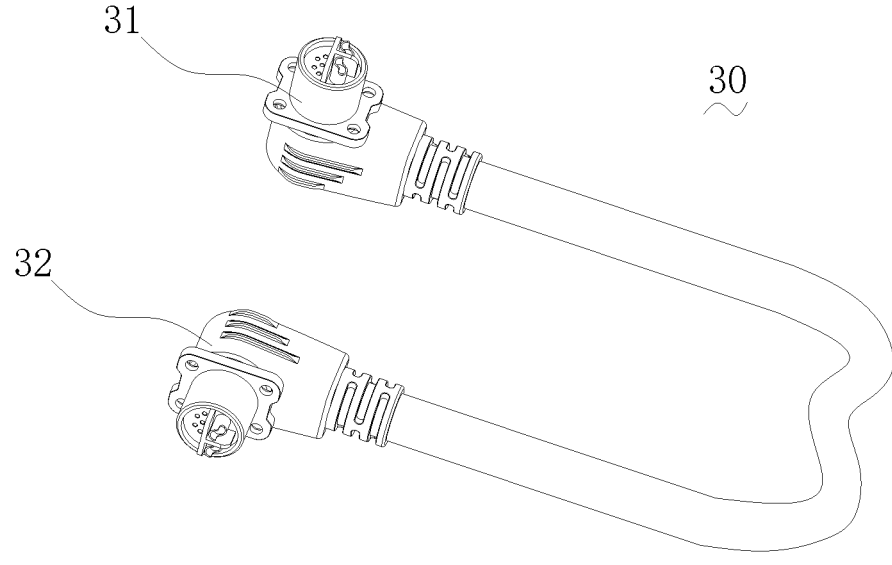
FIG. 5 is a schematic diagram of a connecting wire according to an example of the present application.

In another example, the battery 10 and the inverter 20 of electric bicycle are independent of each other (the housing 23 of inverter 20 is no longer provided with accommodating groove 231). The electric riding vehicle product also includes a connecting wire 30. As shown in FIG. 5, the connecting wire 30 is provided with a first connection terminal 31 and a second connection terminal 32. Correspondingly, in addition to the first discharge port 11 electrically connected to the motor, the battery 10 is also provided with a second discharge port 12, as shown in FIG. 2. When the user is active, the battery 10 is removed from the electric bicycle, then the first connection terminal 31 is electrically connected to the second discharge port 12, and the second connection terminal 32 is electrically connected to the inlet 21, then the battery 10 and the inverter 20 are connected and combined by the connecting wire 30 to form energy storage power source.

The user can also ride the electric bicycle to the event location. In order to make the user use the energy storage power source more conveniently and quickly, as shown in FIG. 1, there is a third discharge port 41 on the frame of the electric bicycle. At this time, there is no need to remove battery 10 from the electric bicycle, the circuit can just be disconnected between battery 10 and motor, and then the first connection terminal 31 is electrically connected to the third discharge port 41 by applying connecting wire 30 to, and then electrically connect the second connection terminal 32 to the inlet 21, thereby the battery 10 of the electric bicycle can be directly converted into the energy storage power source, which is convenient and fast.

Furthermore, the first connection terminal 31 and the second connection terminal 32 of the connecting wire 30 include, but are not limited to, aviation plugs with the same shape and structure. Correspondingly, the inlet 21, the second discharge port 12 and the third discharge port 41 are all corresponding adaptable plug ports.

Figure 10:
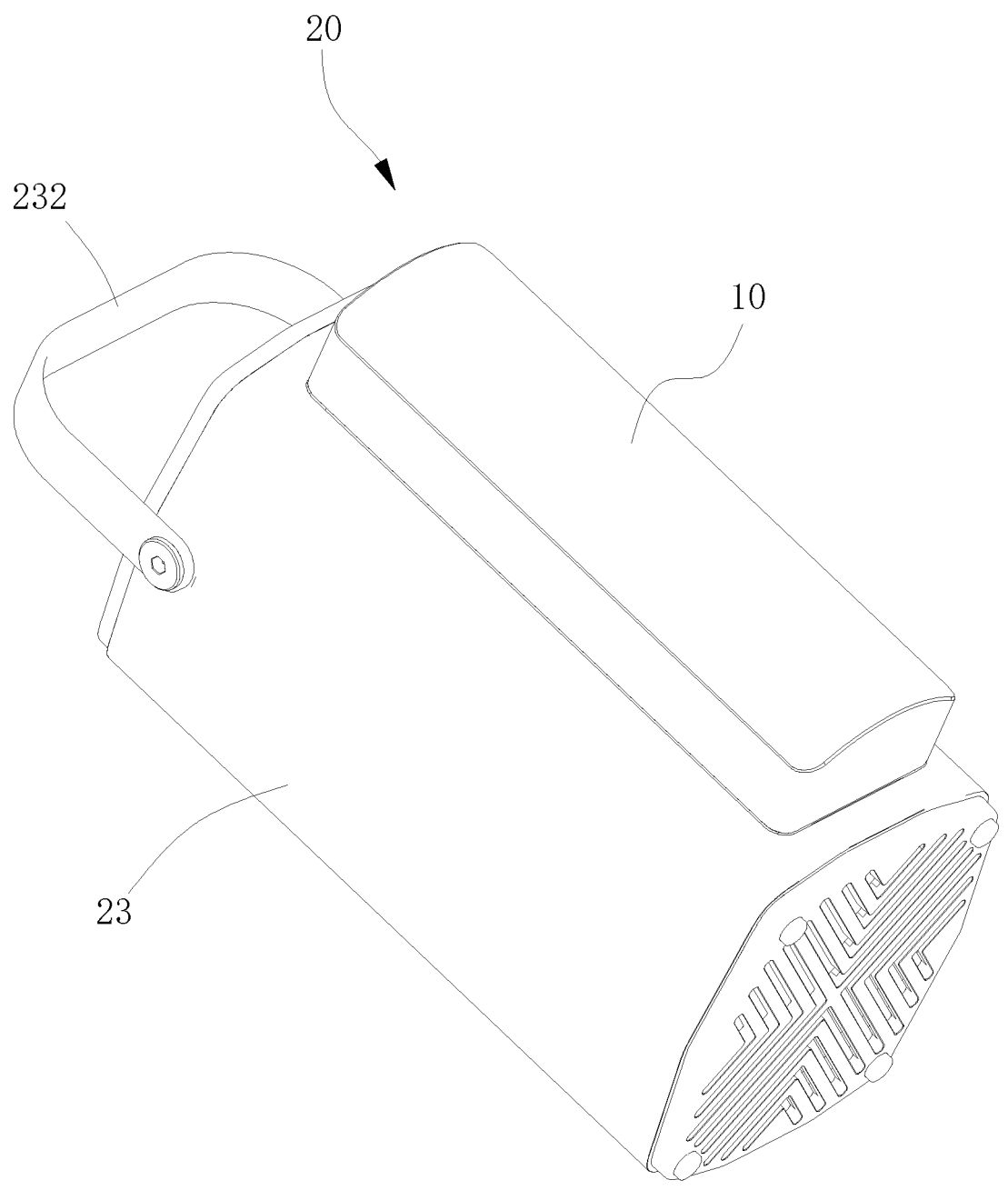
FIG. 10 is a first schematic diagram of an assembly method of an inverter and a battery according to an example of the present application.
Figure 11:
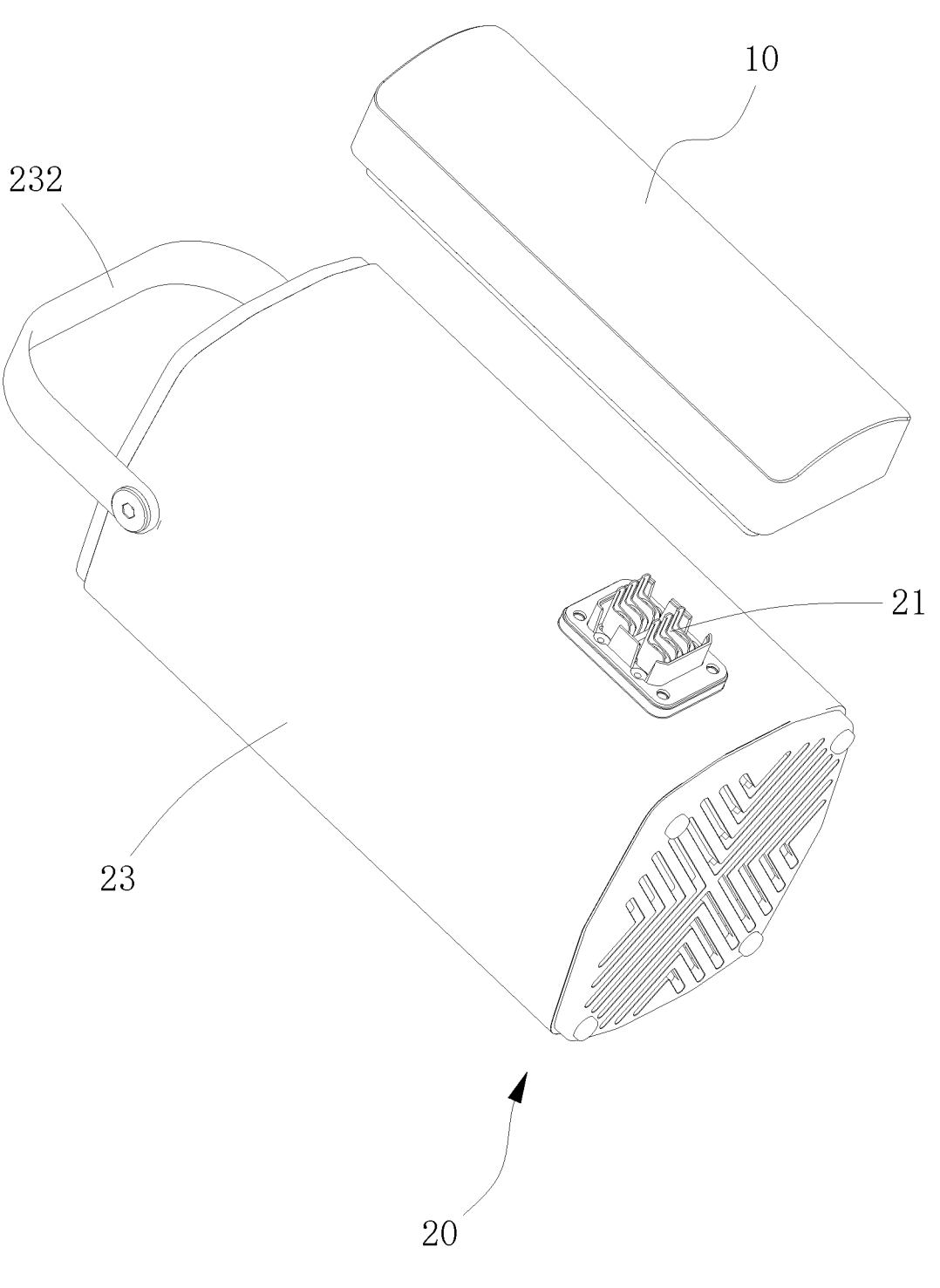
FIG. 11 is a second schematic diagram of an assembly method of inverter and battery shown in FIG. 10.

As shown in FIG. 10 and FIG. 11, in an example, the circumferential side of the housing 23 of the inverter 20 is no longer provided with the accommodating groove 231. After the battery 10 is removed from the frame of the electric bicycle, the battery 10 can be attached to the inverter 20. The housing 23 is spliced on the sidewall of the housing 23, and an inlet 21 is arranged on the sidewall. When the battery 10 is attached to the sidewall of the housing 23, the first discharge port 11 of the battery 10 and the inlet 21 are plugged to complete the electrical connection, so that the current output by the battery 10 is changed by inverter 20 and then output to supply power for electrical equipment, so that battery 10 can be converted into energy storage power source.

Figure 14:
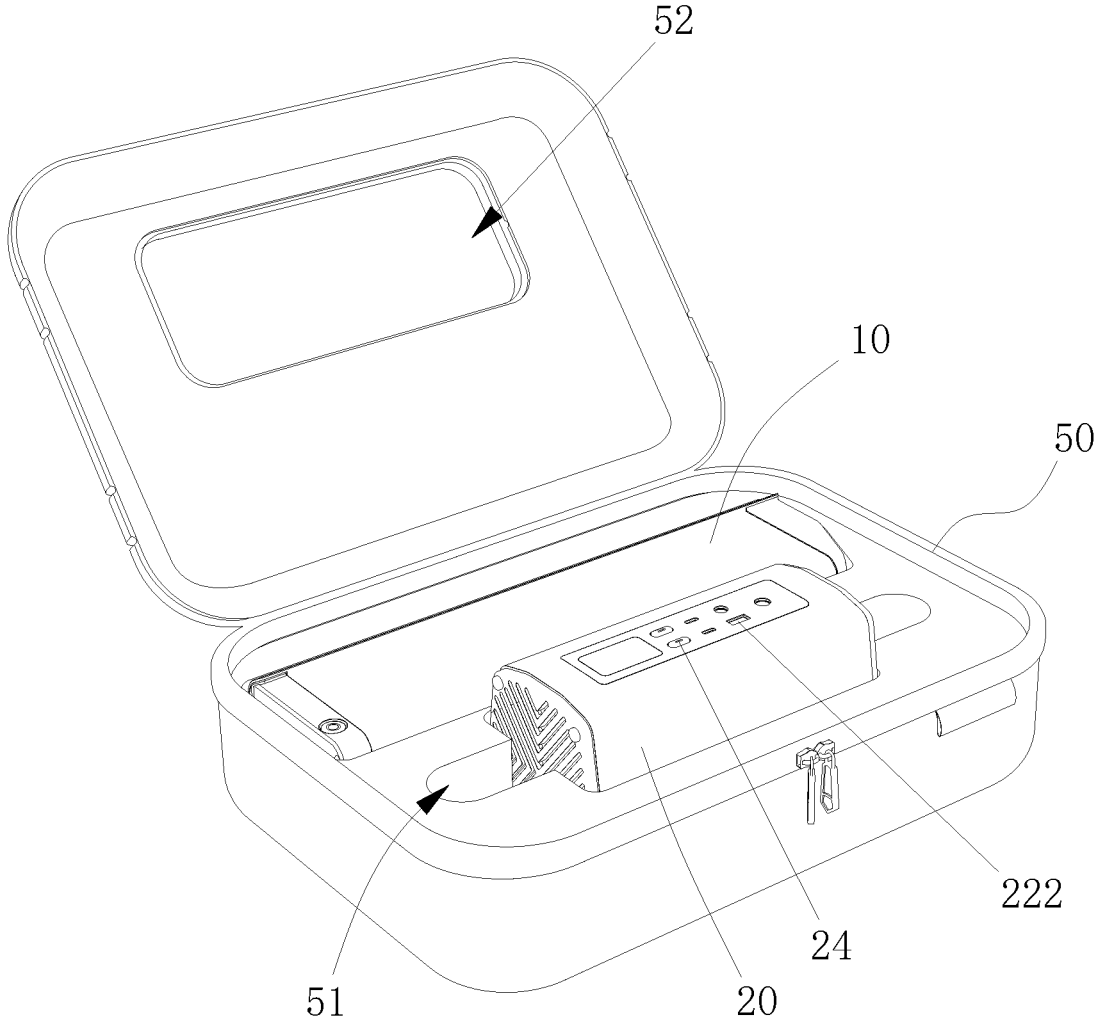
FIG. 14 is a schematic diagram of a battery and an inverter arranged in a portable accommodating box according to an example of the present application.

As shown in FIG. 14, the electric riding vehicle product of the present application further includes a portable accommodating box 50, and the portable accommodating box 50 is provided with an accommodating space 51 for accommodating the battery 10 and the inverter 20. Usually (when the user is not engaged in activities), the inverter 20 is stored in the portable accommodating box 50; the user is engaged in activities, and the user does not ride an electric bicycle, the user removes battery 10 from the electric bicycle, and places the battery 10 and the inverter 20 in the portable accommodating box 50, it is convenient for the user to carry to the destination of the activity. In addition, an open window 52 is arranged on the portable accommodating box 50. When the inverter 20 is arranged in the accommodating space 51, the open window 52 is just opposite to the outlet 22. In this way, the user can directly plug the electrical equipment into the outlet 22 through the open window 52 to achieve electrical connection without the need to take out the battery 10 and the inverter 20 from the portable accommodating box 50.

As shown in FIG. 3, FIG. 4, and FIGS. 6-9, the housing 23 of the inverter 20 of the present application is provided with a handle 232, and the handle 232 is used to carry the inverter 20, which is convenient for carrying the inverter 20 or moving the position of the inverter 20.

The above are only exemplary embodiments of the present application, and are not intended to limit the present application. Any modifications, equivalent replacements and improvements made within the spirit and principles of the present application shall be within the protection scope of the present application.

What is claimed is:

1. An electric riding vehicle, comprising:
   a frame;
   a motor;
   a controller electrically connected to the motor;
   at least one battery outputting direct current, detachably assembled on the frame and electrically connected to the controller; and
   an inverter;
   wherein the at least one battery further comprises at least one discharge port, electrically connectable to the controller;
   wherein the at least one battery is configured to supply power to the motor through the controller;
   wherein the inverter is configured to change the direct current output by the at least one battery to alternating current;
   wherein a housing of the inverter comprises at least one accommodating groove, wherein the inverter comprises at least one inlet arranged on a groove wall of the accommodating groove, and wherein the at least one battery is configured to be coupled to the accommodating groove and the at least one discharge port is configured to be electrically connected to the at least one inlet;
   wherein multiple accommodating grooves are configured in parallel on the housing of the inverter, each of the multiple accommodating grooves comprises a groove wall, an extension direction of each accommodating groove is along a longitudinal direction of the inverter, multiple inlets are respectively configured on the groove walls of the multiple accommodating grooves, the multiple inlets are configured in parallel with each other, the at least one battery comprises multiple batteries respectively disposed in the multiple accommodating grooves, each of the multiple batteries comprises a discharge port, and the discharge ports of the multiple batteries are electrically connected to the multiple inlets respectively.

2. The electric riding vehicle according to claim 1, wherein:

an output voltage of the at least one battery is ranging from 12 Volts to 72 Volts;

the inverter comprises at least one alternating current outlet; and an output voltage of the inverter is ranging from 110 Volts to 220 Volts.

3. The electric riding vehicle according to claim 2, wherein the inverter is further provided with:

at least one direct current outlet for outputting a weak direct current, and a transfer switch configured to switch between the at least one direct current outlet and the alternating current outlet.

4. The electric riding vehicle according to claim 1, wherein the at least one discharge port comprises a first discharge port and a second discharge port, wherein the first discharge ports is used for forming an electrical connection with the controller, and the second discharge ports is used for forming an electrical connection with the inverter.

5. The electric riding vehicle according to claim 1, wherein:

the inverter comprises a housing detachably arranged on the frame; and the at least one battery and the inverter are configured to supply power to an electrical equipment.

6. The electric riding vehicle according to claim 1, wherein the at least one battery comprises at least two batteries, and the at least two batteries are configured to electrically connect to the inverter in parallel.

7. The electric riding vehicle according to claim 1, wherein the at least one inlet is configured on a side wall of the inverter.

8. The electric riding vehicle according to claim 1, further comprising, a connecting wire, comprising a first connection terminal and a second connection terminal, wherein the at least one discharge port further comprises a first discharge port and a second discharge port, wherein the first discharge port is configured to electrically connected to the controller and supply power to the motor via the controller, wherein the first connection terminal is configured to electrically connect to the second discharge port, and the second connection terminal is configured to electrically connect to the inlet of the inverter.

9. The electric riding vehicle according to claim 1, wherein the at least one battery is coupled and arranged on a side wall of the inverter, the side wall of the inverter comprises at least one inlet, and the at least one discharge port is configured to electrically connect to the inlet.

10. The electric riding vehicle according to claim 1, wherein an extension direction of the accommodating groove is along a longitudinal direction of the inverter, an opening of the accommodating groove is configured at one end of the housing of the inverter, an opposite end of the accommodating groove is a closed end, and the at least one inlet is arranged at the closed end.

11. The electric riding vehicle according to claim 1, wherein all the multiple accommodating grooves are arranged at a bottom side wall of the housing of the inverter, and all the multiple accommodating grooves are covered or not covered by a cover plate.

12. The electric riding vehicle according to claim 1, wherein the at least one discharge port comprises a first discharge port, and the frame comprises a second discharge port, the first discharge port being electrically connected to both the controller and the second discharge port; and wherein the electric riding vehicle further comprises:

a connecting wire, the connecting wire being provided with a first connection terminal and a second connection terminal, the first connection terminal being electrically connected to the second discharge port, and the second connection terminal being electrically connected to the inverter.

13. An electric riding vehicle, comprising:

a frame;

a motor;

a controller electrically connected to the motor;

at least one battery outputting direct current, detachably assembled on the frame and electrically connected to the controller; and an inverter;

wherein the at least one battery further comprises at least one discharge port, electrically connectable to the controller;

wherein the at least one battery is configured to supply power to the motor through the controller;

wherein the inverter is configured to change the direct current output by the at least one battery to alternating current;

wherein the at least one battery is coupled and arranged on a side wall of the inverter, the side wall of the inverter comprises at least one inlet, and the at least one discharge port is configured to electrically connect to the inlet;

wherein a side wall of the housing of the inverter comprises multiple accommodating grooves arranged along a circumferential direction of the housing, each of the accommodating grooves is extended along a longitudinal direction of the inverter, a groove wall of each accommodating groove is provided with an inlet, the inlets are arranged in parallel, the at least one battery comprises multiple batteries disposed in the multiple accommodating grooves respectively, each of the multiple batteries comprises a discharge port, and the discharge ports of the multiple batteries are electrically connected to the inlets respectively.

* * * * *